United States Patent
Bosch et al.

(10) Patent No.: US 11,799,106 B2
(45) Date of Patent: Oct. 24, 2023

(54) FUEL CELL SYSTEM AND METHOD FOR ADJUSTING A FUEL CELL SYSTEM

(71) Applicant: Robert Bosch GmbH, Stuttgart (DE)

(72) Inventors: Timo Bosch, Renningen (DE); Tobias Falkenau, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/682,213

(22) Filed: Feb. 28, 2022

(65) Prior Publication Data

US 2022/0278344 A1  Sep. 1, 2022

(30) Foreign Application Priority Data

Mar. 1, 2021 (DE) .......................... 102021201927.7

(51) Int. Cl.
| | |
|---|---|
| *H01M 8/0444* | (2016.01) |
| *H01M 8/2457* | (2016.01) |
| *H01M 8/04082* | (2016.01) |
| *H01M 8/04791* | (2016.01) |
| *H01M 8/0432* | (2016.01) |
| *H01M 8/0438* | (2016.01) |
| *H01M 8/04492* | (2016.01) |
| *H01M 8/04223* | (2016.01) |

(52) U.S. Cl.
CPC ....... *H01M 8/04447* (2013.01); *H01M 8/045* (2013.01); *H01M 8/04201* (2013.01); *H01M 8/04231* (2013.01); *H01M 8/04365* (2013.01); *H01M 8/04432* (2013.01); *H01M 8/04805* (2013.01); *H01M 8/2457* (2016.02)

(58) Field of Classification Search
CPC ......... H01M 8/04201; H01M 8/04231; H01M 8/04365; H01M 8/04432; H01M 8/04447; H01M 8/045; H01M 8/04805; H01M 8/2457
See application file for complete search history.

(56) References Cited

U.S. PATENT DOCUMENTS

2022/0190363 A1\* 6/2022 Jung ................. H01M 8/04447

FOREIGN PATENT DOCUMENTS

DE 102016220223 A1 6/2017

\* cited by examiner

*Primary Examiner* — Victoria H Lynch
(74) *Attorney, Agent, or Firm* — Michael Best & Friedrich LLP

(57) ABSTRACT

A fuel cell system (200) for providing electrical energy. The system (200) comprises a fuel cell stack (201), an anode subsystem (203) with a proportional valve (205) for dosing a volume of gas to be fed to the fuel cell stack (201), a purge valve (207) for discharging gas from the anode subsystem (203) into an exhaust-gas path (209) of the fuel cell system (200), and a control unit (211) for controlling the proportional valve (205) and the purge valve (207). The control unit (211) is configured to use an electrical control current that is fed to the proportional valve (205) to readjust for a purging operation to draw conclusions regarding a hydrogen concentration in a gas that is fed to the purge valve (207), wherein the control unit (211) is furthermore configured to adjust the fuel cell system (200) in a manner dependent on the determined hydrogen concentration.

10 Claims, 2 Drawing Sheets

FUEL CELL SYSTEM AND METHOD FOR ADJUSTING A FUEL CELL SYSTEM

FIELD

The presented invention relates to a fuel cell system and to a method for adjusting a fuel cell system.

BACKGROUND OF THE INVENTION

Polymer electrolyte membrane (PEM) fuel cell systems convert hydrogen into electrical energy using oxygen, with waste heat and water being generated. Here, the conversion of hydrogen takes place by virtue of hydrogen molecules being consumed or removed at the anode side.

A PEM fuel cell is composed of an anode, to which hydrogen is supplied, a cathode, to which air is supplied, and the polymer electrolyte membrane positioned in between. Multiple individual fuel cells of said type are stacked in a fuel cell stack in order to increase the electrical voltage generated. Within such a fuel cell stack, or simply stack, there are situated supply channels which supply hydrogen and air to the individual fuel cells and which discharge waste humid air and waste anode gas.

Nitrogen passes into the anode space inter alia as a result of diffusion processes. Nitrogen constitutes an inert gas for a fuel cell and correspondingly lowers the cell voltage thereof. Nitrogen is thus detrimental to a total voltage of a fuel cell stack, which in turn results in losses in efficiency of the fuel cell stack. In order to minimize such losses in efficiency, gas is repeatedly discharged from the anode space during operation of a fuel cell in order to reduce the nitrogen content in the fuel cell system. This discharge is performed using a so-called purge valve.

The supply of fresh hydrogen to a fuel cell system is commonly performed using hydrogen dosing valves, which may be designed as proportional valves. Here, provision may be made for a gas pressure within the anode path of a fuel cell system, which is measured by means of a pressure sensor at a defined position, to be regulated to a defined setpoint pressure in a manner dependent on the system operating point by means of a hydrogen dosing valve.

Reasons for a replenishment of fresh hydrogen may be firstly a consumption of hydrogen as a result of electrochemical conversion and secondly other losses of gas molecules from the anode space as a result of, for example, an excessively long period of opening of a drain valve, if gas is discharged after a water evacuation operation has been completed, and as a result of opening of a purge valve.

It is common for purge valves, as so-called normally-closed valves, to be equipped with a defined aperture as a flow resistance. The maximum gas flow rate that can be discharged can be structurally defined using such a flow resistance.

A purging operation takes place in a time-controlled manner with clocking dependent on a system operating point, or else on the basis of defined events during system operation. If discharging is performed frequently, a nitrogen concentration is kept low, but fuel is also wasted, and a system efficiency is minimized.

Correspondingly, exact knowledge of a nitrogen concentration that is fed to a fuel cell system is important in order to optimize the frequency of the purging in a system-efficient manner.

Hydrogen sensors installed in the anode path may be used for this purpose. These however in any case constitute an encroachment into the anode path, which is associated with mechanical interfaces. Mechanical interfaces can, in turn, cause leaks. Furthermore, hydrogen sensors are expensive, have a short service life in the context of motor vehicle applications, and are scarcely available.

SUMMARY OF THE INVENTION

In the context of the presented invention, a fuel cell system and a method for adjusting a fuel cell system are presented. Further features and details of the invention will emerge from the respective subclaims, from the description and from the drawings. Here, features and details that are described in conjunction with the fuel cell system according to the invention self-evidently also apply in conjunction with the method according to the invention and vice versa in each case, such that reference is always or can always be made reciprocally with respect to the disclosure of the individual aspects of the invention.

The presented invention serves in particular for optimally adjusting a fuel cell system and achieving a maximum efficiency.

Thus, in a first aspect of the presented invention, a fuel cell system for providing electrical energy is presented. The fuel cell system comprises a fuel cell stack, an anode subsystem with a proportional valve for dosing a volume of gas to be fed to the fuel cell stack, a purge valve for discharging gas from the anode subsystem into an exhaust-gas path of the fuel cell system, and a control unit for controlling the proportional valve and the purge valve. The control unit is configured to use an electrical control current that is fed to the proportional valve in order to readjust for a purging operation to draw conclusions regarding a hydrogen concentration in a gas that is fed to the purge valve. Furthermore, the control unit is configured to adjust the fuel cell system in a manner dependent on the determined hydrogen concentration.

In the context of the presented invention, readjustment is to be understood to mean a process in which, in reaction to a triggering operation, in particular a purging operation performed by means of a purge valve, a positioning element, in particular a proportional valve, is adjusted in order to compensate for a change triggered by the triggering operation.

The presented fuel cell system is configured to dynamically adjust to a hydrogen concentration in a gas that is fed to the fuel cell system. For this purpose, it is for example possible for a purge valve and/or a water drain valve, or drain valve, to be actuated in a manner dependent on a respectively determined hydrogen concentration. In particular, a time for which the purge valve and/or the water drain valve is actuated may be adapted, that is to say lengthened or shortened proceeding from a standard value, in a manner dependent on a determined hydrogen concentration.

Through the dynamic adjustment of the presented fuel cell system to a respectively determined hydrogen concentration, operating processes of the fuel cell system that lead to the discharge of fuel from the fuel cell system, such as a purging operation and/or a water drainage operation, are configured such that a quantity of fuel that is discharged is minimized, and an efficiency of the fuel cell system is accordingly maximized.

The presented invention is based on the principle that a pressure prevailing in a fuel cell system, in particular a supply pressure in a fuel cell stack of the fuel cell system, should be kept constant by the fuel cell system. In the presence of a constant temperature, the pressure prevailing in the fuel cell system varies in a manner dependent on a number of molecules present in the fuel cell system. Gas molecules are removed from the anode space of the fuel cell system by activation of a purge valve. Since hydrogen molecules are very easy to discharge in relation to nitrogen molecules, it has been found that, the more nitrogen molecules are present, the fewer molecules overall can be discharged via the purge valve at the prevailing pressure.

Furthermore, in the event of a discharge of molecules from the anode space by means of the purge valve, the discharged number of molecules must be compensated for by activation of a dosing valve in order to keep the pressure constant. Correspondingly, a nitrogen concentration present in a fuel cell system determines an activity of the dosing valve, such that, on the basis of the activity of the dosing valve, conclusions can be drawn regarding a nitrogen concentration, and based on this a hydrogen concentration, in the fuel cell system.

In other words, the presented invention is based on the principle that the density of a gas or of a gas mixture that is fed to a fuel cell system changes in a manner dependent on a hydrogen concentration in the gas, which in turn has the result that a quantity of gas that must be provided in order to attain a specified pressure changes in a manner dependent on the hydrogen concentration in the gas. This means that, in order to set a specified supply pressure in a fuel cell stack of the fuel cell system, a dosing valve for dosing gas must for example be open for longer, or to a greater degree, if a gas with a high hydrogen concentration and a correspondingly low nitrogen concentration is used than if a gas with a low hydrogen concentration is used. Correspondingly, the presented invention provides that an actuation time of the dosing valve is used as an information source regarding a hydrogen concentration and/or a nitrogen concentration in a respective gas. For this purpose, it is necessary for the dosing valve to be a proportional valve.

Provision may be made for the control unit to be configured to lengthen an actuation time of a water drain valve and/or of the purge valve, in order to adjust the fuel cell system, if the determined hydrogen concentration lies below a specified threshold value, or to shorten the actuation time of the water drain valve and/or of the purge valve, in order to adjust the fuel cell system, if the determined hydrogen concentration lies above the specified threshold value.

A shortening of the actuation time of the purge valve of the presented fuel cell system prevents an unnecessary outflow of fuel or hydrogen, such as can occur if a fixedly specified time window of the actuation time of the purge valve is used.

A lengthening of the actuation time of the purge valve of the presented fuel cell system means that a single purging operation can be used to bring the fuel cell system into a specified operating state. Correspondingly, a lengthening of the actuation time of the purge valve can eliminate possible further purging operations and a resulting unnecessary outflow of fuel or hydrogen, such as can occur if a fixedly specified time window of the actuation time of the purge valve is used.

Provision may furthermore be made for the fuel cell system to furthermore comprise a differential pressure sensor for determining a differential pressure between a position upstream of the purge valve and a position downstream of the purge valve, and for the control unit to be configured to apply an electrical control current to the proportional valve for the purposes of readjustment, which electrical control current has the effect that a change in a supply pressure in the fuel cell stack which occurs during a purging operation is compensated for by introduction of additional gas into the anode subsystem.

Since a pressure prevailing across a purge valve changes in a manner dependent on a hydrogen concentration in a gas flowing to the purge valve, a change in the hydrogen concentration in the gas also causes a change in an electrical control current that is fed, or is to be fed, to the proportional valve. This generally means that, in order to set a specified supply pressure in a fuel cell stack, the proportional valve must be opened for longer, or to a greater degree, in the presence of a high hydrogen concentration than in the presence of a low hydrogen concentration. Here, the supply pressure may be determined directly by means of a single pressure sensor arranged in the fuel cell stack, or as a differential pressure between a pressure in the fuel cell stack and a pressure outside the fuel cell stack.

Provision may furthermore be made for the control unit to be configured to determine, in the electrical control current that is fed to the proportional valve in order to readjust for a purging operation, a magnitude of overshoots during the adjustment of the proportional valve, and to draw conclusions regarding the hydrogen concentration in the gas on the basis of the magnitude of the overshoots.

An overshoot, that is to say a response behavior of an output variable which, after an abrupt change in an input variable, does not directly reach a desired value but overshoots a setpoint value and only subsequently settles to the desired value, changes in a manner dependent on an activity of the proportional valve. For example, a high hydrogen concentration results in a large overshoot because an electrical control current that is provided for activating the proportional valve only has to overcome a low opposing pressure, and a wide opening movement of the proportional valve is correspondingly caused, and vice versa.

Provision may furthermore be made for the control unit to be configured to draw conclusions regarding the hydrogen concentration in the gas on the basis of a ratio of a current intensity of an electrical control current that is fed to the proportional valve when a quasi-steady state takes effect at the proportional valve during the readjustment to a current intensity of an electrical control current that is fed to the proportional valve before the purging operation.

A change in an electrical control current that is fed to the proportional valve of the presented fuel cell system in order to readjust for a purging operation is directly related to a hydrogen concentration in a gas that is fed to the purging valve or to the proportional valve. This change in the electrical control current can be determined particularly easily and accurately as a ratio of a current intensity of an electrical control current that is fed to the proportional valve when a quasi-steady state takes effect at the proportional valve during the readjustment to a current intensity of an electrical control current that is fed to the proportional valve before the purging operation.

Provision may furthermore be made for the control unit to be configured to draw conclusions regarding the hydrogen concentration in the gas on the basis of a gradient of a current intensity of an electrical control current that is fed to the proportional valve for the purposes of readjustment for a purging operation.

Since a change in a current intensity of an electrical control current that is fed to the proportional valve in order to readjust for a purging operation changes in a manner directly dependent on an activity of the proportional valve, the change and in particular the gradient of the current intensity correspondingly reliably and exactly replicate a changed reaction of the proportional valve to a changed hydrogen concentration.

Provision may furthermore be made for the fuel cell system to comprise a temperature sensor for determining a temperature prevailing at the transition from the anode subsystem to the fuel cell stack, and for the control unit to be configured to draw conclusions regarding a water concentration in the gas on the basis of a temperature determined by means of the temperature sensor, and to draw conclusions regarding a hydrogen concentration in the gas on the basis of the water concentration in conjunction with an electrical control current that is fed to the proportional valve in order to readjust for a purging operation.

A temperature in a gas-conducting part of the presented fuel cell system can be determined by means of a temperature sensor, such that a water fraction can be calculated using the knowledge of the temperature in the gas-conducting part, in particular in the anode path, and the assumption, commonly used in practice, that the gas phase is fully saturated with water. Correspondingly, a relative humidity of a gas flowing in the gas-conducting part can be inferred on the basis of the temperature. Therefore, by means of a temperature sensor, the presented fuel cell system can be adjusted not only with regard to the hydrogen concentration but also for the relative humidity.

Provision may furthermore be made for the control unit to comprise an assignment scheme that assigns respective determined values of a current intensity prevailing at the proportional valve to a corresponding hydrogen concentration.

For example, the control unit may comprise a multi-dimensional assignment scheme that assigns respective values of a hydrogen concentration and/or of a relative humidity to corresponding adjustment parameters of the fuel cell system.

According to a second aspect, the presented invention relates to a method for adjusting a fuel cell system. The fuel cell system comprises a fuel cell stack, an anode subsystem with a proportional valve for dosing a volume of gas to be fed to the fuel cell stack, and a purge valve for discharging gas from the anode subsystem into an exhaust-gas path of the fuel cell system. The method comprises a determining step for determining, using an electrical control current that is fed to the proportional valve in order to readjust for a purging operation, a hydrogen concentration in a gas that is fed to the purge valve, and an adjusting step for adjusting the fuel cell system in a manner dependent on the determined hydrogen concentration.

The presented method serves in particular for the operation of the presented fuel cell system.

Provision may be made for a water drain valve and/or a purge valve to be adjusted in the adjusting step, wherein an actuation time of the water drain valve and/or of the purge valve is lengthened if the determined hydrogen concentration lies below a specified threshold value, or the actuation time of the water drain valve and/or of the purge valve is shortened if the determined hydrogen concentration lies above the specified threshold value.

BRIEF DESCRIPTION OF THE DRAWINGS

Further advantages, features and details of the invention will emerge from the following description, in which exemplary embodiments of the invention are described in detail with reference to the drawings. Here, the features mentioned in the claims and in the description may be essential to the invention in each case on their own or in any desired combination.

In the figures.

DETAILED DESCRIPTION

Figure 1A:
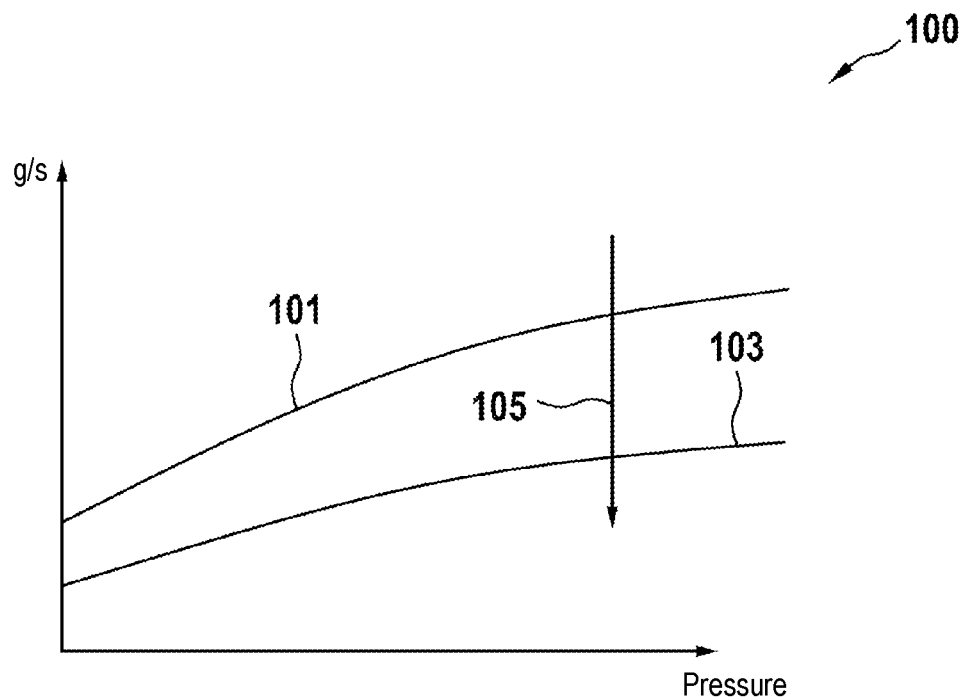
FIG. 1a shows a relationship between different hydrogen concentrations in a gas and a resulting mass flow rate.

FIG. 1a illustrates a diagram 100. In the diagram 100, a differential pressure at a purge valve is plotted on the abscissa, and a mass flow rate, that is to say a mass per unit of time in [g/s], at the purge valve is plotted on the ordinate.

A first curve 101 corresponds to a gas with a first, low hydrogen concentration. A second curve 103 corresponds to a gas with a second, high hydrogen concentration, as indicated by arrow 105.

Comparing the first curve 101 with the second curve 103, it can be seen that, with increasing mass flow rate, both curves also yield an increasing pressure at the purge valve, wherein the pressure according to the second curve 103 increases to a lesser degree, owing to the high hydrogen concentration, than the first curve 101.

Correspondingly, at a given pressure, the mass flow rate is lower in the presence of a high hydrogen concentration than in the presence of a low hydrogen concentration.

Figure 1B:
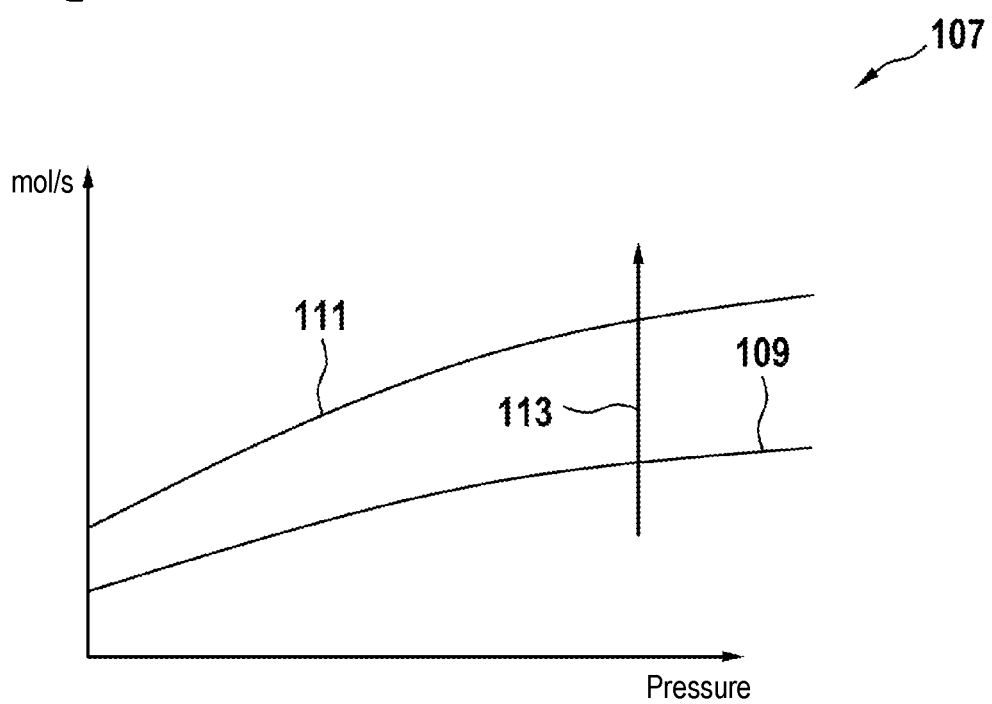
FIG. 1b shows a relationship between different hydrogen concentrations in a gas and a resulting molar flow rate.

FIG. 1b illustrates a diagram 107. In the diagram 107, a differential pressure at a purge valve is plotted on the abscissa, and a molar flow rate, that is to say a number of molecules per unit of time in [mol/s], at the purge valve is plotted on the ordinate.

A first curve 109 corresponds to a gas with a first, low hydrogen concentration. A second curve 111 corresponds to a gas with a second, high hydrogen concentration, as indicated by arrow 113.

Comparing FIG. 1a with FIG. 1b, it can be seen that the trends illustrated in FIG. 1a are reversed in FIG. 1b, such that, in the presence of a constant pressure, the molar flow rate increases with increasing hydrogen concentration.

Depending on what hydrogen concentration is present in the anode path during a purging operation, the proportional valve provided according to the invention must readjust to a greater or lesser degree in order to compensate for a gas loss or a pressure loss caused by the purging operation. Correspondingly, a lower hydrogen concentration is associated with a greater readjustment of the proportional valve, and vice versa.

Using a behavior of the proportional valves during the readjustment in reaction to a purging operation, conclusions can be drawn regarding a hydrogen concentration in a gas that is fed to a corresponding fuel cell. The presented invention is therefore based on the principle whereby the fuel cell system is adjusted in reaction to a behavior of the proportional valve during the readjustment for a purging operation, and, for example, an actuation of the purge valve and/or of a water drain valve of the fuel cell system is dynamically adapted, that is to say lengthened or shortened or increased or reduced, proceeding from a standard value. For this purpose, an electrical control current that is fed to the proportional valve in reaction to the purging operation is evaluated. Since the control current changes proportionally with respect to the opening of the proportional valve, a current intensity of the control current provides information regarding a degree of opening of the proportional valve. On the basis of the degree of opening and the opening duration of the proportional valve, conclusions can be drawn regarding a quantity of hydrogen fed by the proportional valve to an anode subsystem and, based on this, a hydrogen concentration in the anode subsystem.

On the basis of a known hydrogen concentration, it is also possible, in the presence of a known temperature and a correspondingly known relative humidity in a fuel cell stack, to draw conclusions regarding a corresponding nitrogen concentration, and vice versa.

Figure 2:
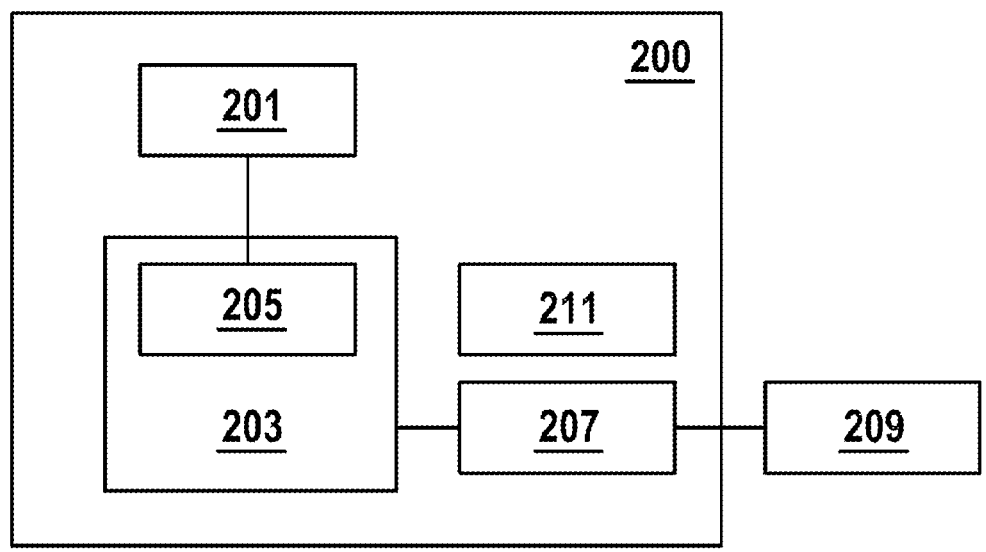
FIG. 2 is a schematic illustration of the fuel cell system according to the invention.

FIG. 2 illustrates a fuel cell system 200. The fuel cell system 200 comprises a fuel cell stack 201, an anode subsystem 203 with a proportional valve 205 for dosing a volume of gas to be fed to the fuel cell stack 201, a purge valve 207 for discharging gas from the anode subsystem into an exhaust-gas path 209 of the fuel cell system 200, and a control unit 211 for controlling the proportional valve 205 and the purge valve 207.

The control unit 211 is configured to use an electrical control current that is fed to the proportional valve 205 in order to readjust for a purging operation to draw conclusions regarding a hydrogen concentration in a gas that is fed to the purge valve 207, and to adjust the fuel cell system 200 in a manner dependent on the determined hydrogen concentration. For this purpose, the control unit 211 may comprise a processor, for example a CPU, an ASIC or any other programmable circuit.

In particular, the control unit 211 is configured to dynamically adapt an actuation of the purge valve 207 and/or of a water drain valve 213 of the fuel cell system 200, that is to say lengthen or shorten or increase or reduce such an actuation proceeding from a standard value, in a manner dependent on the determined hydrogen concentration.

Figure 3:
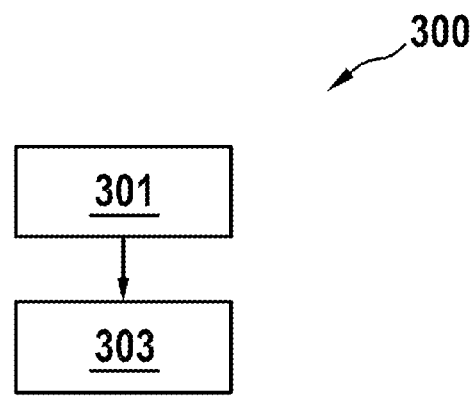
FIG. 3 is a schematic illustration of the method according to the invention.

FIG. 3 illustrates a method 300. The method 300 comprises a determining step 301 for determining, using an electrical control current that is fed to a proportional valve in order to readjust for a purging operation, a hydrogen concentration in a gas that is fed to a purge valve, and an adjusting step 303 for adjusting the fuel cell system in a manner dependent on the determined hydrogen concentration.

The invention claimed is:

1. A fuel cell system (200) for providing electrical energy, wherein the fuel cell system (200) comprises:
   a fuel cell stack (201),
   an anode subsystem (203) with a proportional valve (205) for dosing a volume of gas to be fed to the fuel cell stack (201),
   a purge valve (207) for discharging gas from the anode subsystem (203) into an exhaust-gas path (209) of the fuel cell system (200),
   a control unit (211) for controlling the proportional valve (205) and the purge valve (207),
   wherein the control unit (211) is configured to
     use an electrical control current that is fed to the proportional valve (205) in order to readjust the proportional valve (205) for a purging operation, and determine a hydrogen concentration in a gas that is fed to the purge valve (207),
   wherein the control unit (211) is furthermore configured to adjust the fuel cell system (200) in a manner dependent on the determined hydrogen concentration.

2. The fuel cell system (200) according to claim 1, wherein
the control unit (211) is configured to lengthen an actuation time of a water drain valve and/or of the purge valve (207), in order to adjust the fuel cell system, if the determined hydrogen concentration lies below a specified threshold value, or to shorten the actuation time of the water drain valve and/or of the purge valve (207), in order to adjust the fuel cell system, if the determined hydrogen concentration lies above the specified threshold value.

3. The fuel cell system (200) according to claim 1, wherein
the fuel cell system (200) furthermore comprises a differential pressure sensor for determining a differential pressure between a position upstream of the purge valve (207) and a position downstream of the purge valve (207), and
the control unit (211) is configured to apply an electrical control current to the proportional valve (205) for the purposes of readjustment, which electrical control current has the effect that a change in a supply pressure prevailing in a fuel cell stack which occurs during a purging operation is compensated for by introduction of additional gas into the anode subsystem (203).

4. The fuel cell system (200) according to claim 1, wherein
the control unit (211) is configured to determine, in an electrical control current that is fed to the proportional valve (205) in order to readjust for a purging operation, a magnitude of overshoots during the adjustment of the proportional valve (205), and to determine the hydrogen concentration in the gas based on the magnitude of the overshoots.

5. The fuel cell system (200) according to claim 1, wherein
the control unit (211) is configured to determine the hydrogen concentration in the gas based on a ratio of a current intensity of an electrical control current that is fed to the proportional valve (205) when a quasi-steady state takes effect at the proportional valve (205) during the readjustment to a current intensity of an electrical control current that is fed to the proportional valve (205) before the purging operation.

6. The fuel cell system (200) according to claim 1, wherein
the control unit (211) is configured to determine the hydrogen concentration in the gas based on a gradient of a current intensity of an electrical control current that is fed to the proportional valve (205) for the purposes of readjustment for a purging operation.

7. The fuel cell system (200) according to claim 1, wherein
the fuel cell system (200) comprises a temperature sensor for determining a temperature prevailing at a transition from the anode subsystem (203) to the fuel cell stack (201), and
the control unit (211) is configured to determine a water concentration in the gas based on a temperature determined by means of the temperature sensor, and to determine a hydrogen concentration in the gas based on the water concentration in conjunction with an electrical control current that is fed to the proportional valve (205) in order to readjust for a purging operation.

8. The fuel cell system (200) according to claim 1, wherein
the control unit (211) comprises an assignment scheme that assigns respective determined values of a current intensity prevailing at the proportional valve (205) to a corresponding hydrogen concentration.

9. A method (300) for adjusting a fuel cell system (200), wherein the fuel cell system (200) comprises:
- a fuel cell stack (201),
- an anode subsystem (203) with a proportional valve (205) for dosing a volume of gas to be fed to the fuel cell stack (200),
- a purge valve (207) for discharging gas from the anode subsystem (203) into an exhaust-gas path (209) of the fuel cell system (200), wherein the method (300) comprises:
- a determining step (301) for determining, using an electrical control current that is fed to the proportional valve (205) in order to readjust the proportional valve (205) for a purging operation, a hydrogen concentration in a gas that is fed to the purge valve (207), and
- an adjusting step (303) for adjusting the fuel cell system (200) in a manner dependent on the determined hydrogen concentration.

10. The method (300) according to claim 9, wherein
a water drain valve and/or the purge valve (207) is adjusted in the adjusting step (303), wherein an actuation time of the water drain valve and/or of the purge valve (207) is lengthened if the determined hydrogen concentration lies below a specified threshold value, or
the actuation time of the water drain valve and/or of the purge valve (207) is shortened if the determined hydrogen concentration lies above the specified threshold value.

* * * * *